United States Patent [19]

Matsuyama et al.

[11] Patent Number: 4,713,444

[45] Date of Patent: Dec. 15, 1987

[54] FINISHING METHOD OF POLYMER SLURRY

[75] Inventors: Kiyoshi Matsuyama, Ehime; Takatoshi Suzuki, Chiba; Takeshi Chigusa, Ehime, all of Japan

[73] Assignee: Sumitomo Chemical Company, Limited, Osaka, Japan

[21] Appl. No.: 868,486

[22] Filed: May 30, 1986

Related U.S. Application Data

[63] Continuation of Ser. No. 664,171, Oct. 24, 1984, abandoned.

[30] Foreign Application Priority Data

Oct. 28, 1983 [JP]  Japan .................................. 58-203057

[51] Int. Cl.$^4$ ............................................... C08F 6/16
[52] U.S. Cl. ...................................... 528/502; 526/348
[58] Field of Search ...................... 526/348, 351, 352; 528/502

[56] References Cited

U.S. PATENT DOCUMENTS 3,468,863  9/1969  Payne et al. ........................ 528/480

FOREIGN PATENT DOCUMENTS 1583074  1/1981  United Kingdom .

Primary Examiner—Paul R. Michl
Attorney, Agent, or Firm—Sughrue, Mion, Zinn, Macpeak, and Seas

[57] ABSTRACT

A polymer slurry formed by polymerizing ethylene or propylene optionally with other olefin monomer copolymerizable therewith in a hydrocarbon solvent such as propylene, propane, butane, etc., is continuously or intermittently supplied to a filter having a filtering surface on which a slight quantity of polymer particles are retained. Most of the hydrocarbon solvent is recovered by passing through the filtering surface, and the polymer particles are overflown from the filter to recover as a wet cake. By the use of such a specific filter, the quantity of the solvent to be vaporized can be greatly reduced.

3 Claims, 3 Drawing Figures

FINISHING METHOD OF POLYMER SLURRY

This is a continuation of application Ser. No. 664,171, filed Oct. 24, 1984, abandoned.

FIELD OF THE INVENTION

The present invention relates to a method for finishing a polymer slurry which is composed of an olefinic polymer and a hydrocarbon solvent having a small number of carbon atoms.

BACKGROUND OF THE INVENTION

Many industrial methods for polymerizing olefins in hydrocarbons having 5 carbon atoms or less are known; typical examples of such methods include a method which comprises polymerizing ethylene in liquefied hydrocarbons having 4 carbon atoms (Philips' method), a method which comprises polymerizing propylene in liquefied propylene (Japanese Published Examined patent applications Nos. 17184/63, 24479/65, 39998/76, etc.), a method which comprises copolymerizing ethylene and propylene in liquefied propylene to obtain ethylene-propylene rubbers (Monte-Edison's method, Japanese Patent Publication Nos. 3291/1962 and 10491/1961, etc.), etc.

These methods all use hydrocarbons having a small number of carbon atoms as solvents in a polymerization vessel so that the polymerization conditions are generally required to maintain a high pressure of 5 kg/cm$^2$G or higher.

To recover the polymer from the polymer slurry by removing the solvent, a method which comprises reducing the pressure of the system from high pressure to thereby vaporize the solvent, the so-calleed flash method, has been adopted because the solvent is easily vaporizable (for example, see Japanese Published Examined patent application No. 24479/65).

In recovering the polymer, the polymer slurry obtained by polymerization is flashed as it is or after it is washed. Washing is one means for removing low molecular weight polymers, polymers having poor tacticity and catalyst residues, all of which are soluble in the solvent, and eliminating factors that have adverse influence upon physical properties (for example, stickiness of film, service stability, process stability, etc.) of final products of the polymer.

In this direct flash method for the polymer slurry, it is necessary to vaporize a large quantity of solvent, compress the vaporized solvent and if desired, purify the solvent by means of distillation, etc., and the consumed energy contributes much to the energy required for the overall process.

For this reason, a method which comprises sedimenting and condensing the polymer in a polymerization vessel or in a washing vessel and discharging the condensed polymer slurry has also been devised in order to reduce the amount of the vaporized solvent. To discharge the polymer in a slurry state, however, means that the quantity of the solvent discharged with the polymer is still large.

Paying attention to the foregoing problems and as a result of extensive investigations, the present inventors have found, as a method for greatly reducing the energy consumption as compared with the conventional methods, a method for separating and recovering a polymer from a polymer slurry which comprises filtering a polymer slurry under high pressure while maintaining the solvent in liquid phase, whereby the polymer is continuously obtained as a wet cake, and thus have accomplished the present invention.

SUMMARY OF THE INVENTION

The present invention is directed to a method for recovery of a polymer which comprises homopolymerizing ethylene or propylene or copolymerizing ethylene or propylene with other olefin in a hydrocarbon solvent having 3 to 5 carbon atoms, continuously or intermittently supplying a polymer slurry formed as it is or after it is washed, to a filter having a filtering surface on which a slight quantity of polymer particles are retained, whereby most of the hydrocarbon solvent is recovered by passing through the filtering surface and the polymer particles are overflown from the filter to recover the polymer as a wet cake.

DETAILED DESCRIPTION OF THE INVENTION

Figure 1:
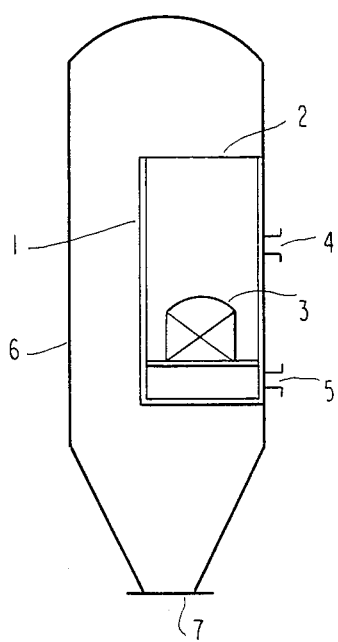
FIG. 1 is a cross-sectional schematic view of the filter used in the present invention.

Examples of the hydrocarbon having 3 to 5 carbon atoms used as the solvent in the present invention include propylene, propane, n-butane, isobutane 1-butene, 2-butene, isobutylene, n-pentane, isopentane, cyclopentane, a pentene, etc.

Examples of the olefin copolymerizable with ethylene or propylene include, on basis of ethylene, propylene, 1-butene, hexene, 4-methylpentene-1, etc., and, on basis of propylene, ethylene, 1-butene, hexene, 4-methylpentene-1, etc. Catalytic systems for polymerization are Ziegler-Natta catalysts well known in the art, examples of which include combinations of metal compounds such as Ti, V, Cr, etc., with organoaluminum compounds. However, there is no particular limitation as far as the catalysts give polymers of high activity in high yield.

The polymer slurry of the present invention may be a polymer slurry that has been hitherto obtained using the hydrocarbon solvent. The concentration of the slurry may be approximately in the range of from 200 to 700 g of polymer/l-solvent but it is not particularly limited thereto.

In case that the polymer slurry is washed in the present invention, washing methods heretofore known are adopted.

For example, there is a method which comprises charging the polymer slurry in a vessel equipped with a stirrer, adding large quantities of solvents thereto, if desired, together with deactivators of the catalyst and other auxiliary agents, stirring for a determined period of time, then setting and taking the supernatant solvent out (if desired, this procedure being repeated). To continuously wash, it is desired to use a countercurrent washing tower shown in Japanese Published Unexamined patent applications Nos. 79589/75, 3679/77, etc.

For separation of the polymer particles and the solvent from the polymer slurry, a continuous-type filter is employable in the present invention.

In a batch-type filter, a cycle comprising a supply of the polymer slurry→filtration (separation and recovery of the solvent)→discharging of the cake (recovery of the polymer) is repeated. In the case that the pressure is close to atmospheric pressure and the solvent is aqueous, the batch-type filtration works sometimes, but when the batch-type filter is applied to the polymer slurry under high pressure as in the present invention, the equipment becomes large, the cost for the equipment becomes expensive and the cake is discharged only with difficulty, etc., so that the batch-type filtration is not effected in the present invention.

In the continuous-type filter used in the present invention, the polymer slurry is continuously or intermittently supplied thereinto while maintaining the state holding a slight amount of the polymer on the filtering surface thereof, whereby the solvent is passed through the filtering surface and taken out of the filter, thus the solvent is recovered. The polymer particles are accumulated in order and ultimately overflown from the opening. Thus, the polymer particles are recovered as a wet cake.

An embodiment of the continuous-type filter used in the present invention is shown in FIG. 1.

The whole of filter 1 is mounted to the inside of high pressure vessel 6. The polymer particles are present around filtering element 3 having a filtering surface. The polymer slurry is fed from inlet 4, and the solvent is passed through the filtering element 3 and then discharged through discharge outlet 5.

The polymer particles are converted into a cake which is accumulated on the filtering element 3 to push the previously formed cakes upwards and overflown from upper portion 2. The overflown cake is once retained at the bottom of the high pressure vessel 6 and intermittently or continuously withdrawn from discharge outlet 7.

The filter is characterized by the following:

(1) Filtration is performed in a state where the polymer particles are always present around the filtering element 3 so that clogging of the filtering element 3 can be prevented.

The polymer slurry contains polymers having 10 μm or less in addition to polymer particles having a relatively large size of 50 to 2,000 μm, and fine powders of catalyst residues and, therefore, the filtering element generally tends to be clogged.

When the filtering element is clogged, it is necessary to take any measure, e.g., exchange of the filtering element per se, cleaning of the filtering element by often flowing a washing liquid from the back surface of the filtering element, etc. In case that the polymer particles are always present around the filtering element as in the present invention, the polymer particles per se form a primary filtering layer to prevent fine powders from reaching the filtering element. Thus, clogging of the filter can be prevented.

(2) The polymer particles are overflown from the upper portion 2 and accordingly, it is not necessary to discontinue the flow of the polymer slurry due to the filter. Therefore, the overall process for manufacturing the polymer can be smoothly operated.

(3) The amount of the solvent in the cake recovered is minimized so that the solvent can be easily vaporized under reduced pressure to render the removal easy.

To effect the vaporization, heat insufficient for vaporizing the solvent can easily be supplemented by heating the exhaust lines subsequent to the discharge outlet 7 at the bottom of the high pressure vessel 6.

As the filtering element, a cylindrical filter having pleats, a cylindrical filter of flat type, a filter of tube type, a filter of disc type, a filter of leaf disc type, and the like can be employed.

As a matter of course, the filtering area is determined depending upon the amount of the polymer slurry to be treated. Needless to say, it is required that the filter should have strength such that it can withstand the impact of the polymer particles and the pressure of the filtration.

The accuracy of filtration required for the filter is determined depending upon the particle size contained in the polymer slurry but it is generally advantageous to use the filter having the accuracy of filtration in a diameter range of 2 to 200 μm when glass beads are passed through a filter medium in accordance with the JIS B8356 method.

As such filtering materials, there can be used those obtained by molding these materials by compression sintering, vacuum sintering, etc., using as materials metals having strong resistance to rust such as powdery particles of, e.g., 18-8 stainless steel, Hastelloy, Carpenter, Inconell, Monel, nickel, etc., fine fibers or metal mesh having a small pore size.

Figure 2:
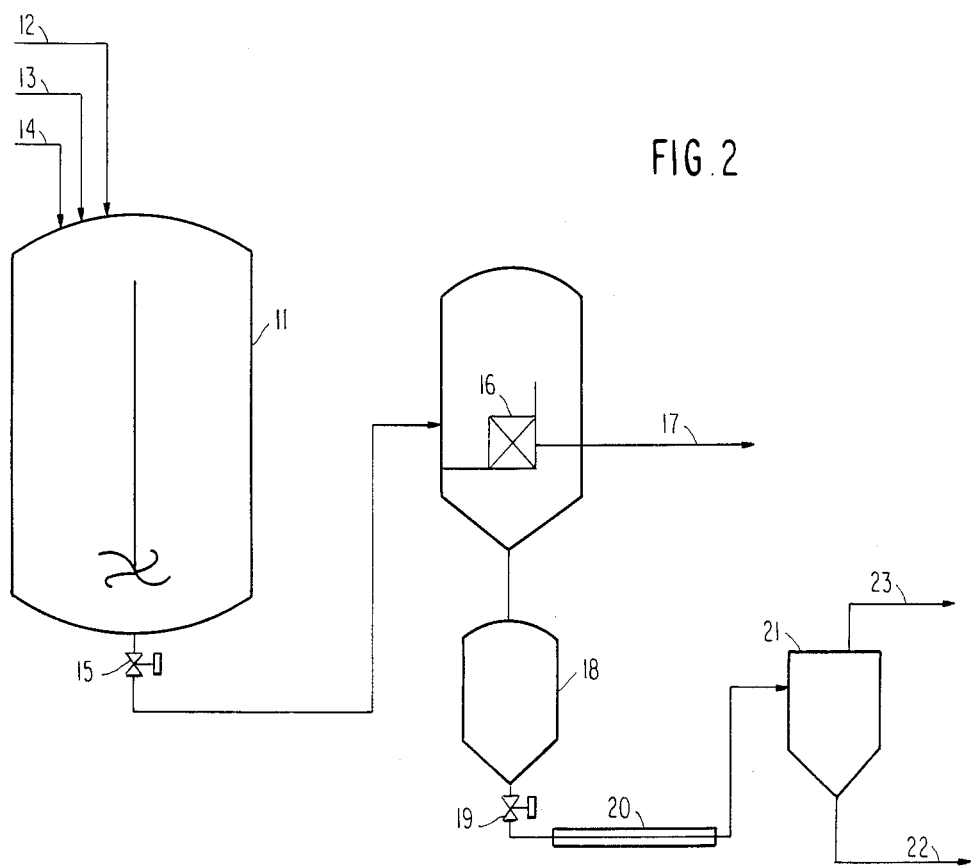
FIG. 2 is a flow chart showing an embodiment of the present invention.
Figure 3:
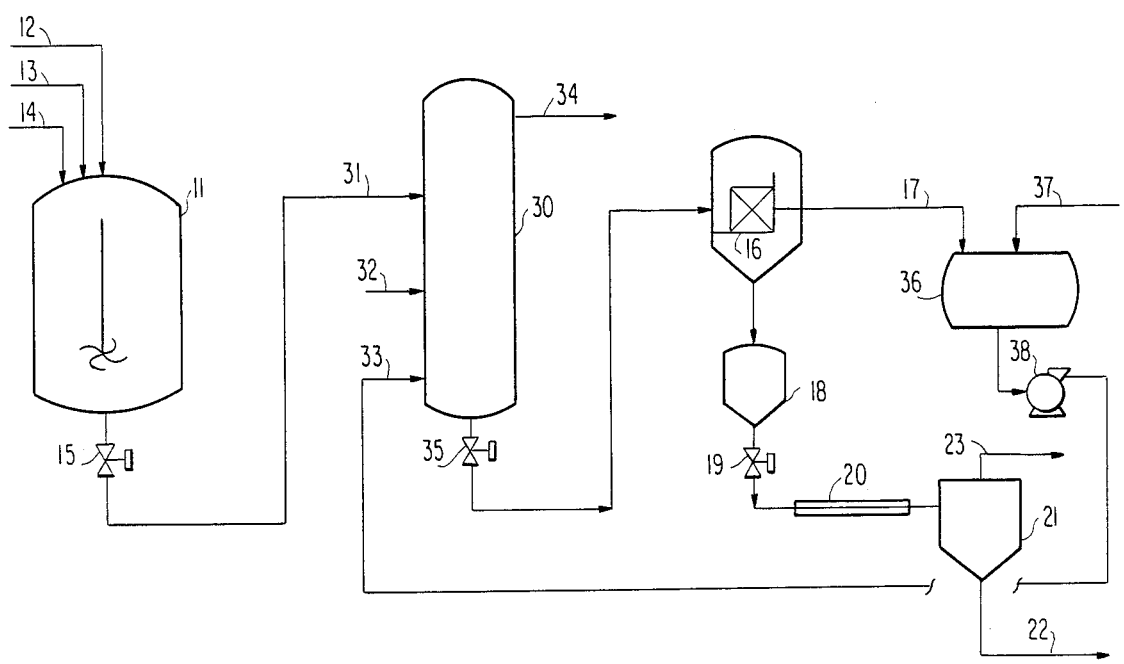
FIG. 3 is a flow chart showing an embodiment of the present invention wherein washing of the polymer slurry is carried out.

Next, an example of manufacturing the polymer of the present invention is shown in FIGS. 2 and 3.

In FIG. 2, monomers (ethylene or propylene or other comonomers), a solvent and a catalyst are continuously or intermittently supplied in polymerization vessel 11 through lines 12, 13 and 14, respectively, whereby polymerization is carried out to form a polymer slurry. The polymer slurry is continuously or intermittently withdrawn through discharge valve 15 and then supplied in filter 16. The polymer slurry is filtered, and the solvent of the filtrate is discharged through line 17. The solvent of the filtrate may be recycled to the polymerization vessel 11 through the line 13 as it is or after purification. The polymer becomes a cake-like state and overflows from the filter 16 and then enters into hopper 18 for receiving the cake. The cake is intermittently or continuously withdrawn from the hopper 18 from discharge valve 19. The pressure is then reduced, and the cake is passed through heating line 20. The solvent remained in the polymer cake is gasified due to the pressure reduction and the heating. The gas is separated with separator 21 and then discharged from line 23. On the other hand, the polymer particles are withdrawn from line 22.

FIG. 3 shows an embodiment in which countercurrent washing tower 30 is used as an example further including an additional washing step.

The polymer slurry is supplied to the countercurrent washing tower 30 through line 31. A solvent for washing is supplied through line 33. Through overflow line 34, the solvent containing soluble polymers and catalyst residues is discharged. The polymer slurry washed is continuously or intermittently withdrawn through discharge valve 35 and supplied to the filter 16. The solvent of the filtrate coming from the filter 16 is treated in a manner as explained in FIG. 2 except that the solvent is used as the solvent for washing through the line 17 and buffer tank 36. In FIG. 3, numeral 32 is a line for supplying a catalyst deactivator, etc., to the countercurrent washing tower 30; numeral 37 is a line for supplementing the solvent for washing; and numeral 38 is a pump for supplying the solvent to the countercurrent washing tower 30 from the buffer tank 36 through the line 33.

The present invention will be explained in more detail with reference to the examples below.

EXAMPLE 1

Based on the flow chart shown in FIG. 2, the procedure was performed as follows.

(1) Preparation of Polymer Slurry of Propylene

As the polymerization vessel 11, a stirring vessel of 30 m$^3$ was used, and a catalyst system composed of about 0.11 kg/hr of a titanium trichloride catalyst (prepared in accordance with Example 1 of U.S. Pat. No. 4,165,298), about 1.0 kg/hr of diethylaluminum chloride and 40 g/hr of methyl methacrylate was charged therein in liquid propylene, followed by continuous polymerization of propylene at 70° C. The polymer slurry withdrawn from the polymerization vessel 11 comprised 1,200 kg/hr in average of a granular polymer, 7.5 kg/hr in average of a so-called atactic polymer soluble in liquid propylene and 1,350 kg/hr in average of unreacted liquid propylene containing the catalyst system charged.

(2) Filtration of Polymer Slurry

The vessel of the filter 16 had an inner diameter of about 500 mm$\phi$ and a length of 1 m and encased a 16 step-discoid leaf disc type filter element (having about 1 m$^2$ of filtering area) in the inside thereof.

The polymer slurry prepared in (1) above was continuously supplied to the filter 16.

Filtration proceeded smoothly, and 850 kg/hr in average of liquid propylene as the solvent was recovered from the line 17. In the hopper 18, a cake composed of 1,200 kg/hr in average of a granular polymer and 500 kg/hr in average of propylene was recovered.

The cake was intermittently discharged through the discharge valve 19, and propylene was gasified in the heating line 20. The gas was separated from the polymer in the separator 21. The polymer was withdrawn at temperatures of 60° to 70° C. through the line 22 in which propylene was gaseous and contained in such a trace amount that it was accompanied in spacings of the polymer particles. The polymer particles had a mean particle diameter of 600 μm, in which the amount of fine powders having 100 μm or less was approximately 0.1%.

Gaseous propylene was recovered by a compressor through the line 23.

The amount of gaseous propylene recovered was 500 kg/hr in average.

In accordance with the flow chart shown in FIG. 2, the operation was continued for 3 days. The operation smoothly proceeded without clogging of the filter.

When the polymer slurry was flash vaporized as it was without using the filter of the present invention, propylene recovered in a gaseous state was 1,350 kg/hr in average; accordingly, the amount of gaseous propylene recovered can be reduced to 37% according to the present invention.

EXAMPLE 2

Based on the flow chart shown in FIG. 3, the procedure was performed as follows.

(1) Preparation and Washing of Polymer Slurry

The preparation of the polymer slurry was performed in a manner similar to Example 1. The polymer slurry was supplied to the countercurrent washing tower 30 through the line 31, and 1.5 kg/hr of isobutanol was introduced from the line 32. 1,200 kg/hr of propylene of 65° C. for washing was continuously supplied from the line 33.

From the line 34, 1,600 kg/hr in average of liquid propylene containing catalyst residues, atactic polymers and isobutanol was discharged.

The polymer slurry withdrawn from the discharge valve 35 positioned at the lower portion of the countercurrent washing tower 30 comprised 1,200 kg/hr in average of a granular polymer and 950 kg/hr in average of liquid propylene.

(2) Filtration of Polymer Slurry

A filter having the same structure as in Example 1 was used, and the polymer slurry prepared in (1) above was continuously supplied to the filter 16.

Filtration proceeded smoothly. From the line 17, 450 kg/hr in average of liquid propylene as the solvent was recovered. In the hopper 18, a cake composed of 1,200 kg/hr in average of a granular polymer and 500 kg/hr in average of propylene was recovered.

Subsequently, the cake was treated in a manner similar to Example 1.

Gaseous propylene was passed through the line 23 and recovered with a compressor. The amount recovered was 500 kg/hr in average.

When the polymer slurry was flash vaporized as it was without using the filter of the present invention, propylene recovered in a gaseous state was 950 kg/hr in average. Accordingly, the amount of gaseous propylene recovered can be reduced to 53% according to the present invention.

This Example was worked out over a period of 1 month, during which no clogging occurred in the filter and filtration proceeded satisfactorily.

While the invention has been described in detail and with reference to specific embodiments thereof, it will be apparent to one skilled in the art that various changes and modifications can be made therein without departing from the spirit and scope thereof.

What is claimed is:

1. A method for recovering a polymer from a slurry of said polymer which comprises:
    homopolymerizing ethylene or propylene or copolymerizing ethylene or propylene with another olefin in a hydrocarbon solvent having 3 to 5 carbon atoms, using a filter having a filtering zone which is composed of a filter element and an upper portion in a high pressure vessel, and
    continuously supplying a polymer slurry formed as it is or after it is washed, to the filtering zone in the filter having a filtering surface on which a slight quantity of polymer particles are retained,
    whereby most of said hydrocarbon solvent is recovered by passing through said filtering surface and the polymer particles which form a cake accumulate upwardly and overflow from the upper portion of the filter to be recovered as a wet cake.

2. The method of claim 1, wherein said hydrocarbon solvent is selected from the group consisting of propylene, propane, n-butane, isobutane, 1-butene, 2-butene, isobutylene, n-pentane, isopentane, cyclopentane, and a pentene.

3. The method of claim 1, wherein said polymer slurry has a concentration of about 200 to 700 g/l-solvent.

* * * * *